(12) United States Patent
Vanderbeken et al.

(10) Patent No.: US 12,172,342 B1
(45) Date of Patent: Dec. 24, 2024

(54) METHOD AND APPARATUS FOR DRY-CLEANING PLASTICS CONTAMINATED WITH ORGANICS

(71) Applicants: Marc Alphonse Vanderbeken, Mons (BE); Cedric Jean-Luc Vanderbeken, Ixelles (CA); Olivier Hugo Christopher Dany Vanderbeken, Sudbury (CA)

(72) Inventors: Marc Alphonse Vanderbeken, Mons (BE); Cedric Jean-Luc Vanderbeken, Ixelles (CA); Olivier Hugo Christopher Dany Vanderbeken, Sudbury (CA)

( * ) Notice: Subject to any disclaimer, the term of this patent is extended or adjusted under 35 U.S.C. 154(b) by 0 days.

(21) Appl. No.: 18/233,301

(22) Filed: Aug. 12, 2023

(51) Int. Cl.
  *B29B 17/02* (2006.01)

(52) U.S. Cl.
  CPC ...... *B29B 17/02* (2013.01); *B29B 2017/0234* (2013.01)

(58) Field of Classification Search
  CPC .................. B29B 17/02; B29B 2017/0234
  See application file for complete search history.

(56) References Cited

U.S. PATENT DOCUMENTS

| | | | |
|---|---|---|---|
| 2,052,869 A | 9/1936 | Coanda | |
| 4,106,705 A * | 8/1978 | Nakamura | B07B 9/02 |
| | | | 241/49 |
| 4,440,635 A * | 4/1984 | Reiniger | D21B 1/322 |
| | | | 241/86.1 |
| 5,197,678 A * | 3/1993 | Trezek | B29B 13/10 |
| | | | 241/DIG. 38 |
| 5,871,161 A * | 2/1999 | Nishibori | D21B 1/028 |
| | | | 241/DIG. 38 |
| 10,898,907 B2 * | 1/2021 | Vanderbeken | B07B 1/185 |
| 11,389,992 B1 * | 7/2022 | Vanderbeken | C02F 11/04 |
| 2016/0207806 A1 * | 7/2016 | Oude Grotebevelsborg | |
| | | | C02F 11/127 |

FOREIGN PATENT DOCUMENTS

| | | | | |
|---|---|---|---|---|
| CN | 108621336 A | * | 10/2018 | |
| CN | 112078057 A | * | 12/2020 | |
| DE | 202009010696 U1 | | 12/2009 | |
| EP | 0310947 A2 | * | 4/1989 | ............. B29B 17/02 |
| EP | 4197734 A1 | | 6/2023 | |
| KR | 200387250 Y1 | * | 6/2005 | |

(Continued)

OTHER PUBLICATIONS

KR-20230039793-A, Machine Translation. (Year: 2023).*

(Continued)

*Primary Examiner* — Duy Vu N Deo
*Assistant Examiner* — Christopher Remavege (57) ABSTRACT

Disclosed herein is a method and depackager apparatus for removal of organics and cleaning of residual plastics from a waste stream in a depackager. The method comprises injecting a stream of air into a filtration drum, comprising the residual plastic, of the depackager. Further, the method comprises creating a turbulence within the filtration drum using predetermined structures deployed in the filtration drum, such that the residual plastic passes through a first end of the filtration drum to a second end of the filtration drum. Finally, the method comprises collecting cleaned residual plastic through the second end of the filtration drum.

12 Claims, 6 Drawing Sheets

(56) References Cited

FOREIGN PATENT DOCUMENTS

| KR | 101819547 | B1 | * | 1/2018 | |
| KR | 20230039793 | A | * | 3/2023 | ............ Y02W 30/62 |

OTHER PUBLICATIONS

EP-0310947-A2, Machine Translation. (Year: 2023).*
CN-108621336-A, Machine Translation. (Year: 2024).*
CN-112078057-A, Machine Translation. (Year: 2024).*
KR 200387250 Y1, Machine Translation. (Year: 2024).*
KR 101819547 B1, Machine Translation. (Year: 2024).*
Svetlana Tretsiakova-McNally et al. Separation and Characterization of Plastic Waste Packaging Contaminated with Food Residues, MDPI, Harvard, Jul. 2023: Polymers, vol. 15, No. 13, 2943, pp. 1-20. https://doi.org/10.3390/polym15132943.
Lange, J.-P. Managing plastic waste—Sorting, recycling, disposal, and product redesign. ACS Sustain. Chem. Eng. 2021, 9, 15722-15738. [CrossRef].
Geng, X.; Song, N.; Zhao, Y.; Zhou, T. Waste plastic resource recovery from landfilled refuse: A novel waterless cleaning method and its cost-benefit analysis. J. Environ. Manag. 2022, 306, 114462. [CrossRef] [PubMed].
Hopewell, J.; Dvorak, R.; Kosior, E. Plastics recycling: Challenges and opportunities. Phil. Trans. R. Soc. B 2009, 364, 2115-2126. [CrossRef] [PubMed].
Internet URL Mavitec paddle washer: https://mavitecgreenenergy.com/solutions/washing/paddle-washer/.
Xia, D.; Zhang, F.-S. A novel dry-cleaning system for contaminated waste plastic purification in gas-solid media. J. Clean. Prod. 2018, 171, 1472-1480. [CrossRef].
Internet URL: Ecoverse: https://www.youtube.com/watch?v=Hq3umPGdgU0 second 30.
Raka Noveriyan Putra, Tri Ayodha Ajiwiguna. Influence of Air Temperature and Velocity for Drying Process. Engineering Physics International Conference, EPIC 2016. Procedia Engineering 170 (2017) 516-519.
Alessia Alessi et al. Mechanical separation of impurities in biowaste: Comparison of four different pretreatment systems. https://www.sciencedirect.com/science/article/abs/pii/S0956053X20301082?via%3Dihub.

* cited by examiner

METHOD AND APPARATUS FOR DRY-CLEANING PLASTICS CONTAMINATED WITH ORGANICS

FIELD OF INVENTION

The present disclosure relates, in general, to waste management. Particularly, the present disclosure relates to a method of dry-cleaning the plastic wastes and a depackager thereof.

BACKGROUND

The disposal of food-waste materials that are combined with packaging materials and inorganics is a challenging process. Depackaging systems separate plastics and packaging from food waste. The plastic and wrapping materials that a depackager fails to remove often goes first in the digester and might end up on the land where the digestate is disposed. The separated plastics and packaging often contain too many organics, so that they cannot be recycled, and they end up in the landfill.

Therefore, a cleaning step should take place before it can process into Refuse Derived Fuel (RDF). The cleaning step could include washing, with either hot or cold water, with a detergent added. Washing with the water is a costly process not only because it needs extra equipment, but also the water must be subjected to water treatment after the packaging has been washed.

One of the existing prior arts disclosed in a journal by Svetlana Tretsiakova-McNally et al. (STM) states: "There is a potential to optimize this process by cleaning the packaging as contaminated plastics usually are not suitable for reprocessing. For both mechanical and chemical recycling, it is essential that a cleaning step has taken place. The process may include washing, with either hot or cold water, with added detergents based on caustic agents. Washing with water can be costly due to the need for specialist washing facilities and, also, the need for further water treatment after plastics have been washed. Moreover, it can lack efficiency as certain contaminants cannot always be removed. Additionally, the process can be complex, requiring four or five stages, and with the addition of media as well as longer 'cleaning' times". Further, the disclosure indicates that a significant volume of water (approximately 40 L/kg packaging) would be required to clean the packaging to an acceptable level for further reuse or recycling. Accordingly, the proof-of-concept (POC) technology described in the said disclosure can effectively separate food residual amounts from plastic waste materials to a level acceptable for further re-use or recycling of the plastic packaging. This POC addresses the problem of cleaning the plastics but does not address the loss of biogas yield. The waste stream created is composed of organics that should have been more efficiently removed and micro plastics that have been produced during the cleaning process.

The STM also teaches: "To the best of authors' knowledge, there are no recent reports on inexpensive 'dry cleaning' and separation of hard-to-recycle plastic packaging waste, originated from the AD facilities and heavily contaminated with food residues. Moreover, an important issue of microplastics generated during recycling processes, which is often overlooked by researchers and industry, was considered in this study." Another important finding in the study of STM is the fact microplastics retain more organics: "The organics retention on the 'smaller' particles was in the range between 28.7 and 68.1% and, on average, was three times higher than the one calculated for the 'larger' particles of microplastics, which ranged from 6.8 to 21.2%."

However, it is not unusual to have 70-80% organic in the rejects that have been processed in a depackager without air injection. A large part of these could be diverted to the Anaerobic Digester (AD) and turned into energy if the efficiency of the depackager could be improved. Cleaner plastics also means better recovery and more organics to the AD, thus a better yield of the feedstock.

Figure 8:
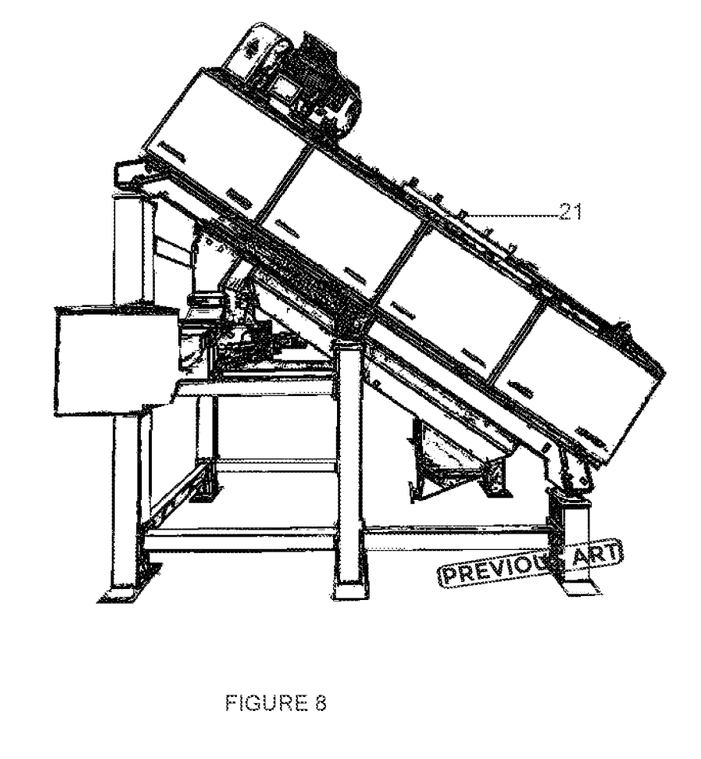
FIG. 8 shows a paddle washer, as disclosed in prior art.
Figure 9:
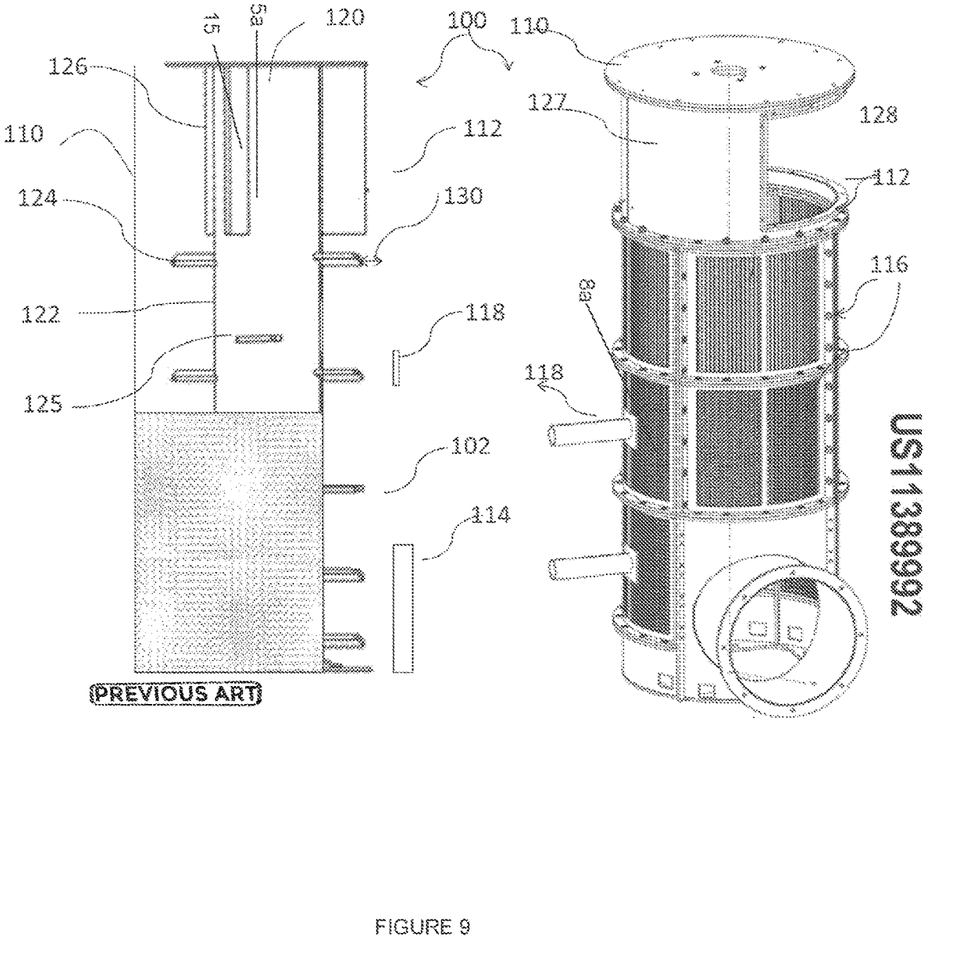
FIG. 9 shows the vertical paddles of an existing system (disclosed in U.S. Ser. No. 11/389,992), as disclosed in prior art.

Since the above problems are widely known, the industry is trying to adapt by introducing on-site cleaning equipment installed after the depackager. One such example is the "Mavitec paddle washer" (shown in FIG. 8). This is in principle a depackager for highly contaminated plastics, which uses a considerable amount of energy as well as water. Reprocessing has further size reduction and creation of more micro plastics as a result. The organics retention on the 'smaller' particles is three times higher than the one calculated for the 'larger' particles of microplastics, which implicates that the organics removed contain more microplastics than larger plastics that are removed by dry cleaning. Here, water is injected through inlets (21). However, water, especially cold water is not an effective cleaner of organics and greases. Using hot water is more effective but is expensive. A detergent or other chemicals is needed to properly clean a surface from organics. This is a known fact in, for instance, cleaning dishes manually or in a dish washer. Evidently, using water does not have satisfactory results.

Therefore, there is a need for a method and apparatus for sufficient cleaning of the separated packaging and lightweight reject particles that are removed from a depackager.

The information disclosed in this background of the disclosure section is only for enhancement of understanding of the general background of the invention and should not be taken as an acknowledgement or any form of suggestion that this information forms the prior art already known to a person skilled in the art.

SUMMARY OF THE INVENTION

The present disclosure relates to a method that enhances the removal of organics and cleaning residual plastics from a contaminated food waste stream in a depackager itself without the need of extra equipment. That is, the present invention comprises a method for accomplishing the above objective with a method that is based on cleaning with air in combination with turbulence created by the paddles, hammers or blades placed in the depackager.

The proposed depackager consists of a vertical or horizontal perforated filtration drum within the center of a shafted mill composed of hammers or paddles or blades. A contaminated organics feedstock is introduced in the apparatus and the organics are pushed through the filtration drum with the combination of centrifugal force and pressing, while the packaging leaves the equipment at the exit outlets (2) positioned at an opposite side of the entry points (1).

It is an objective of the present disclosure to effectively separate food residual amounts from plastic waste materials to a level acceptable for further re-use or recycling of the plastic packaging. Accordingly, adding air prior to or during the separation process inside the depackager or feeding conveyor results in cleaner rejects as the high-speed air and turbulence cleans the rejects during the depackaging.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference features and components which are same or alike. Some embodiments of system and/or methods in accordance with embodiments of the present subject matter are now described, by way of example only, and regarding the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

In an embodiment, the proposed method enhances removal of organics and cleaning residual plastics from a contaminated food waste stream in a depackager itself. Accordingly, the present invention proposes a method that is based on cleaning with air in combination with turbulence created by the paddles, hammers or blades placed in the depackager.

Figure 3:
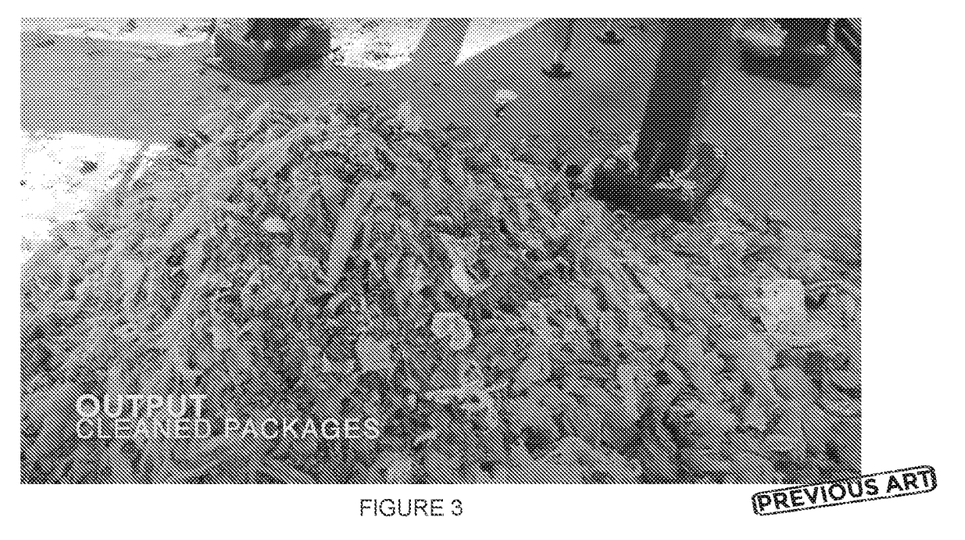
FIG. 3 shows the rejects out of a depackager (11) not equipped with an extra air intake, as disclosed in prior art.
Figure 4:
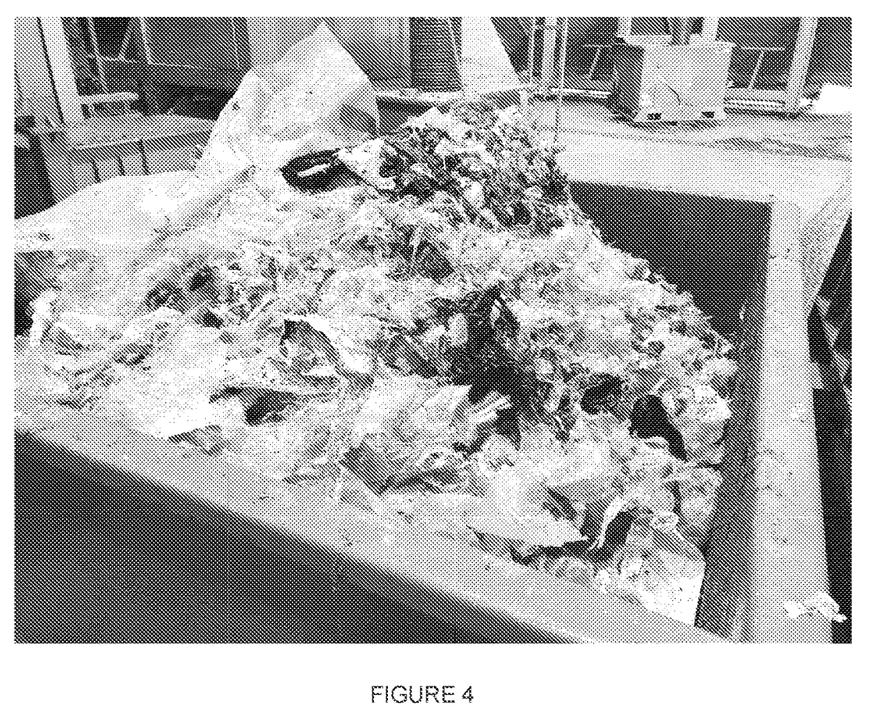
FIG. 4 shows the rejects out of a depackager (11) equipped with an extra air intake.
Figure 5:
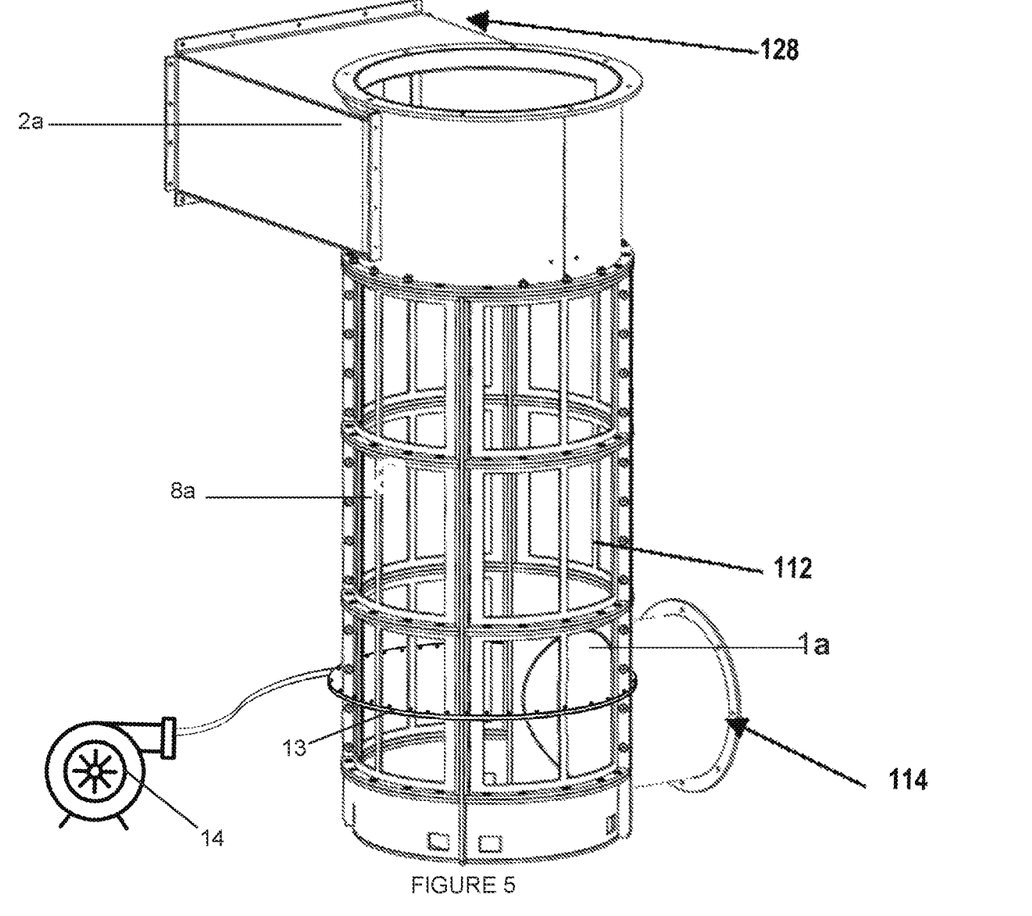
FIG. 5 shows the introduction of air via a ring with nozzles.
Figure 6:
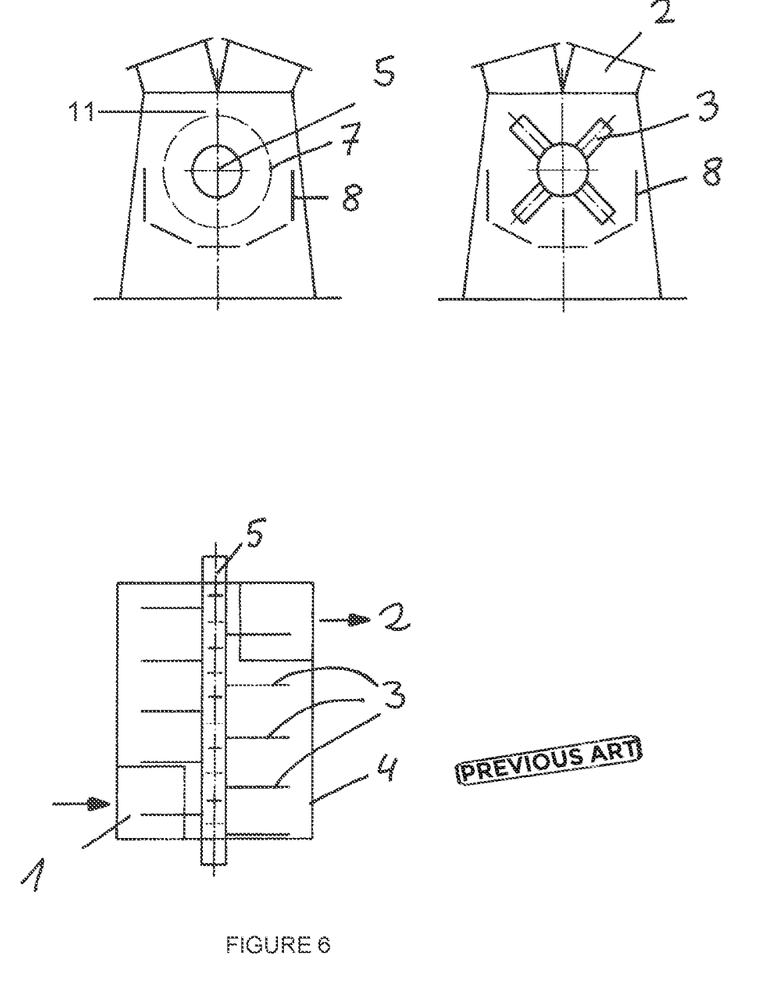
FIG. 6 shows a depackager (11) with components, as disclosed in prior art.
Figure 7:
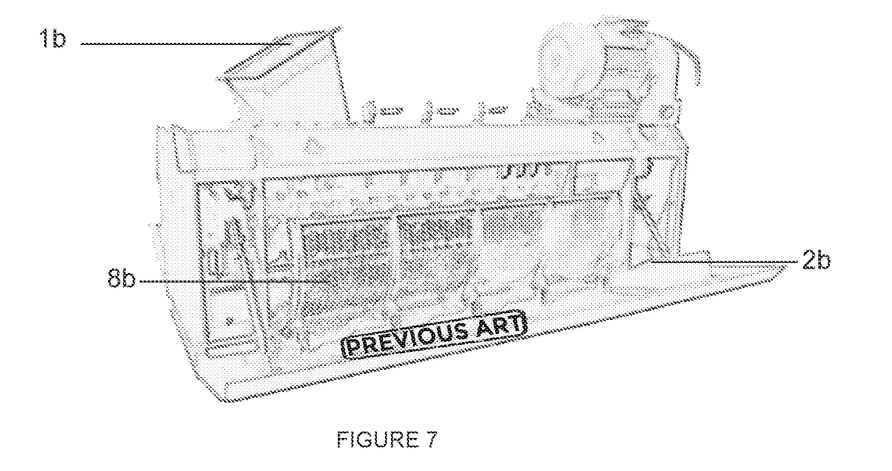
FIG. 7 shows a horizontal depackager (11) with the screens.

The light contaminants leave the depackager (11) either though the top (2a) or at the opposite from the entry in the drum (2b) with the help of the paddles. However, the discharged plastic packaging waste is often still contaminated with organics with food residues. The difference in cleanliness upon the visual observation of FIG. 3 and FIG. 4 is obvious and the contamination in FIG. 4 is removed by the dry cleaning.

In an embodiment, a large quantity of air is introduced at the entry level of the depackager (11) and fills the void that is present in a large part of the area between the shaft the spinning radius in the central portion of the drum (8) that is empty around the shaft. As the paddles or hammers are throwing the organics at a high speed against the inner wall of the filtration drum (8), the center part of the drum around the shaft (5) is empty. For a vertical depackager (11a) there is an empty space around the shaft (5a) only above the liquid discharge level.

In an embodiment, the empty space in the center can be used in combination with the paddles to create turbulence and the collision of the plastics at high speed to clean the plastics thanks to the air addition. Air is a good cleaning agent and for instance pressured air is highly effective in cleaning off dusty surfaces, machinery and even clothing and PPE. This phenomenon is already described in patent U.S. Ser. No. 11/389,992, a device presently marketed by Drycake under the TWISTER name. For instance, in U.S. Ser. No. 11/389,992, the air movement is created by vertical paddles (15) on the top of the vertical hammermill (11b) that suck up the plastics and thus create a high-speed air movement.

Cleaning results of the rejects in this apparatus due to the turbulence and impact of the paddles are already above industry standards. However, testing with an addition of air at the entry level by introducing air through a flange (13a) has further improved the cleanliness of the packaging.

The cleanliness of the packaging in FIG. 3 shows the results of treatment in a vertical depackager without any addition of air where FIG. 4 shows the quality that is obtained by the turbulence and knocking of the plastics on the paddles prior to leaving the apparatus.

Figure 1:
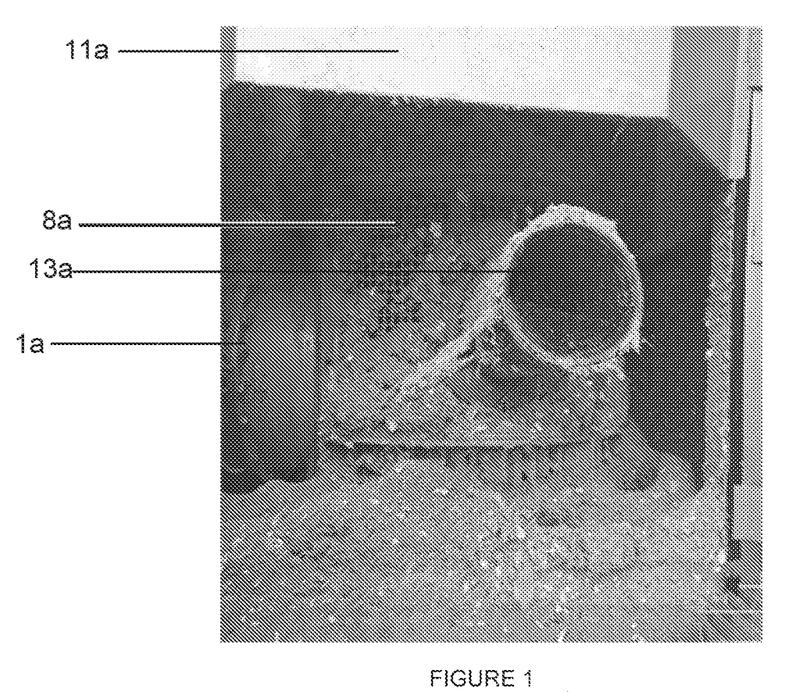
FIG. 1 shows the introduction of air via a flange (13a) in a vertical depackager (11)
Figure 2:
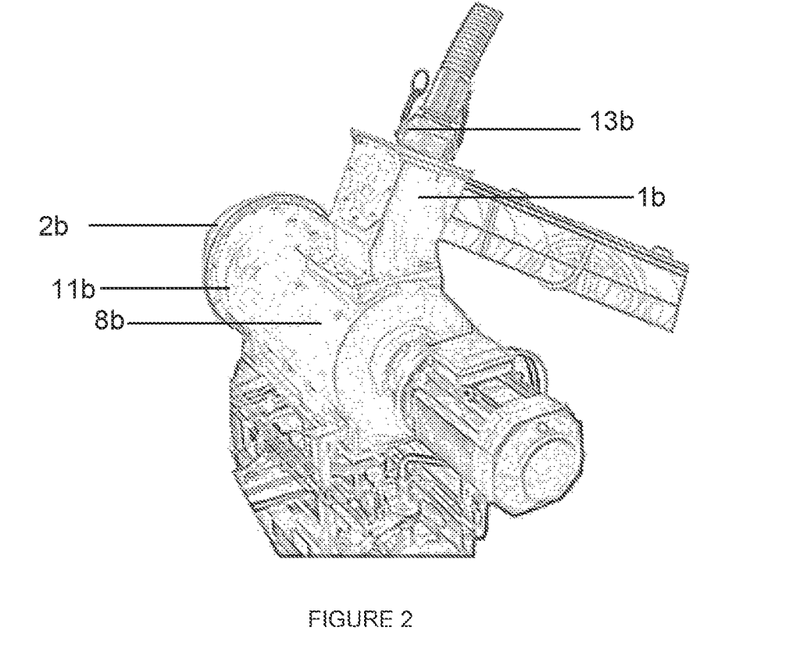
FIG. 2 shows the introduction of air via a flange (13b) in a horizontal depackager (11)

The air in FIG. 1 and FIG. 2 is introduced via an air intake flange (13) which is attached at a bottom position of the filtration drum (4) of a vertical depackager or to the intake above the inlet (1) of a horizontal depackager (11b). The intake flange (13) is configured to inject air in the filtration drum (8) by an external blower (14).

In an embodiment, a person familiar with the art might opt to add the air in different ways or in different positions but does not change anything to the essence of this invention. Air could be introduced for instance via 1 or more nozzle arrangements (13), positioned on different levels, or only 1 above the dilution inlet (118), welding 2 or more small ½ inch pipe either around the drum of the vertical depackager (11) or on the first part of the drum of a horizontal depackager (11b).

FIG. 3 is an example of the separated plastics collected from a depackager (11) of the brand Tiger (Tigerdepack) without any air injection.

FIG. 4 is an example of packaging discharged with dry cleaning in a Twister. Testing was also done with a horizontal depackager (11) of the brand Hybag (FIG. 2). Here, the air was added at the discharge of the feeding screw on top of the inlet (1b) opening of the depackager (11). The result was not only much cleaner packaging but also larger pieces and less microplastics than without the addition of air.

It shall be noted that similar results were found in a test with a depackager (11) of the brand Wackerbauer (FIG. 2) (patent DE202009010696 U1).

Further, EP4197734 A1 teaches about a depackager (11) mounted on a support platform where there may be provision for the installation of an air which serves to actuate the pneumatic control valves for various components of the apparatus and actuating the pneumatic valves. However, Garbellini does not teach us about air being injected in the apparatus that could be used for the dry-cleaning process of the packaging.

In an embodiment, the paddles and hammers connected to the center shaft (5) often have a curved shape and act as bouncing plates, described in patent U.S. Ser. No. 11/389, 992. This allows for a Coanda effect to remove the liquids and let the plastics flow through. Coanda effect is the tendency of a moving fluid, either liquid or gas, to attach itself to a surface and flow along the curve. It is also known as the wall-attachment effect. The effect is named after Romanian inventor Henri Coanda, who described it as "the tendency of a jet of fluid emerging from an orifice to follow an adjacent flat or curved surface and to entrain fluid from the surroundings so that a region of lower pressure develops. The law of conservation of energy states that the total energy of an isolated system remains constant.

In an embodiment, the curved surface will draw to it the stream of organics, which will be attracted and deflected, flowing along the surface and then normally would continue along its inertial motion. The centrifugal force will then force the liquid outwards which has a cleaning effect on the plastics. An increase in the speed of a fluid occurs simultaneously with a decrease in pressure or a decrease in the fluid's potential energy.

A consequence of the Bernoulli theorem is that a fast-flowing stream drags and accelerates some air around it creating a velocity and a pressure gradient in the air: the faster the air, the lower the pressure around the stream. The centrifugal force created by the paddles or vanes propels the almost incompressible liquid, being organics, to the inside of the filtration drum where it will be expelled. Bernouilli's principle is widely applied in the touchless electric hand dryers that are present in public washrooms.

For hard plastics, the organics and a dried organics coating on plastics will be separated by the impact and consequent vibration effect because of the contact with the hammers. This is similar to removal of mud on a stone with a small kick on the stone with for instance a hammer Similar action is known for how a bricklayer removes the mortar from a brick. In various embodiments, an air intake flange (3) is attached at a bottom position of the filtration drum (4) of a inlet (1a) of a vertical depackager (11a) or to the intake of a horizontal depackager (11b). The intake flange (3) is configured to inject air in the filtration drum (8).

In various embodiments, the apparatus comprises an exit passage (2) for the light waste at the opposite site of the inlet (1). The rotary assembly and paddles help moving the packaging and plastics in the contaminated liquid to the exit while the heavy waste and organics settle at the bottom of the filtration drum (8a) in case of a vertical separator or in case of a horizontal depackager (11) are partially discharged by gravity through the filtration drum or being ejected through said drum by centrifugation.

While in patent U.S. Ser. No. 11/389,992 the rotor assembly (120) includes two or more vertical plates (126) extending perpendicular to the shaft (122) and mounted at a top position thereof that are configured to create a suction force to lift the plastics and packaging upwards, the addition of air at the entry level of the depackager (11) has improved further the cleaning of the packaging.

Present depackagers often operate on the principle of centrifugation which requires the minimum technical possible clearance between the paddles of said devices and their filtration drum resulting in shredding of the packaging and the creation of micro-plastics. Packaging and organics are projected by force against the filtration drum and are scraped off the filtration drum and scraped off while the packaging is squeezed outwards.

The separated plastics in a depackager (11) are moving gradually forward exposing the plastics to multiple impacts of the blades. Introducing high speed air will reduce the plastics retention time in the depackager (11) and reduce the number of times they are hit by the paddles, thus retaining a larger size for the plastics.

In an embodiment, the arrangement of the paddles on the rotor will provide a tumbling and bouncing effect on the separated plastics from the contaminated liquid, as they will stop and hit the plastics that are blown out. The impact now cleans the plastics. The advantage of incorporating the dry cleaning in the depackager (11) itself is not only that no other equipment is required, but also that fewer micro plastics are generated and other than the external blower (14) of for instance 7.5 kW no other energy is required.

The impact of the air on the packaging also reduces the number of times the plastics are being shredded in the process. In various embodiments, the addition of air has a cleaning effect without additionally shredding the material which is being cleaned.

In various embodiments, the speed of the paddles or rotor must be adjustable to adapt to different feedstocks. There are several types of food waste and to separate effectively not only the speed has to be adjusted but also the screen size.

In an embodiment the depackager (11) is used for cleaning compost. Compost is a dry material that is normally cleaned by screening or density separators. In another embodiment, the depackager is used to clean Source Separated Organics (SSO). In another embodiment, the depackager is used to dewater the 8 mm (3-4 inch) fraction of the MSW separation. The addition of air transforms a depackager (11) into an effective compost cleaner.

In another embodiment, the proposed method and system may be used to treat bakery waste. The bakery waste that is not fully baked and has a solids content in the 50s tends to form a dough that will plug the screens and might even plug the depackager (11). The addition of air can now reduce moisture due to the drying effect of the high quantity of air. The effect will be indeed the same as experienced by hand dryers, where a minimal extra drying transforms the dough into a powder that can go through the screens. A change in the quantity of air has a higher impact on drying a product than temperature. This can be illustrated by the drying of laundry outside. The impact of heavy wind is more important than a temperature change. However, warmer air will accelerate the drying even more. Also, for bakery waste, only a small temperature change is required to change the nature of the product. Thus, injection with warm air will allow better separation.

In another embodiment, waste from fast food restaurants is treated in the depackager (11) without dilution. This waste has an extremely low organics content and contains mainly packaging. In airports a similar type of organics is generated.

In another embodiment, the proposed method can accomplish efficient classification and resource conversion of landfilled refuse for waste plastic cleaning, and 90-94% cleaning rate.

In yet another embodiment, the plastics removed by the depackager (11) not equipped with the air cleaning can be reprocessed in a vertical or horizontal depackager (11) equipped with the air drying. Packaging removed by a standard depackager (11) contains too many contaminants and the depackager (11) with air becomes a stand-alone piece of equipment.

In yet another embodiment, contaminated plastics from a tire manufacturing facility can now be cleaned without requiring the step of moisturizing this waste stream.

In yet another embodiment the apparatus can be used as a continuous dry-cleaning apparatus to clean plastics as per the findings of STM, however without the creation of micro plastics and where the organics can be recovered practically free of micro plastics and the plastics are separated cleaned and an industrial application for Waste plastic resource recovery from landfilled refuse as described by Geng et al.

In yet another embodiment plastic rotates in the screening drum with hot air circulating. Turbulent airflow ideally dries it. At the same time impurities such as sand, earth, or dust are separated through the screen without the use of water.

Depending on the degree of type of contamination, the apparatus is either used as a stand-alone or to optimize washing plants as a pre-cleaning or post-cleaning step.

In yet another embodiment the apparatus can be used for removing contaminants when treating contaminated soils.

The terms "including", "comprising", "having" and variations thereof mean "including but not limited to", unless expressly specified otherwise.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The enumerated listing of items does not imply that any or all the items are mutually exclusive, unless expressly specified otherwise. The terms "a", "an" and "the" mean "one or more", unless expressly specified otherwise.

While various aspects and embodiments have been disclosed herein, other aspects and embodiments will be apparent to those skilled in the art. The various aspects and embodiments disclosed herein are for purposes of illustration and are not intended to be limiting, with the true spirit being indicated by the claims.

What is claimed is:

1. A method of removal of organics and cleaning of residual plastics from a waste stream in a depackager, the method comprising:

feeding a waste stream comprising residual plastics into a filtration drum of the depackager;

injecting a stream of air into the filtration drum from a blower external to the depackager, wherein the stream of air fills a central portion of the filtration drum;

creating air movement and air turbulence within the filtration drum using predetermined structures deployed in the filtration drum, such that the residual plastic is cleaned as it passes through a first end of the filtration drum to a second end of the filtration drum; and collecting cleaned residual plastic through the second end of the filtration drum.

2. The method of claim 1, wherein the predetermined structures comprise at least one of paddles, hammers and blades.

3. The method of claim 1, wherein the predetermined structures throw the organics against an inner wall of the filtration drum.

4. The method of claim 1, wherein the predetermined structures are attached to a central shaft positioned inside the filtration drum.

5. The method of claim 1, wherein the predetermined structures have a curved surface, applying a centrifugal force on the residual plastic while the residual plastic is passed through the filtration drum.

6. The method of claim 1, wherein the depackager is one of a horizontal depackager or a vertical depackager.

7. The method of claim 6, comprises injecting the stream of air at a position above the waste stream in the filtration drum in a vertical depackager.

8. The method of claim 1, comprises injecting the stream of air via a first intake opening of the filtration drum.

9. The method of claim 6, wherein the stream of air is injected at a top end of a feeding conveyor of a feeding screw, prior to entry of the residual plastic in the horizontal depackager.

10. The method of claim 1, wherein the cleaned residual plastic is passed through an exit passage.

11. The method of claim 6, wherein waste and separated organics settle at a bottom of the filtration drum in the vertical depackager.

12. The method of claim 6, wherein the waste and separated organics in the horizontal depackager are partially discharged by gravity through the filtration drum or ejected through the filtration drum by centrifugation in the horizontal depackager.

* * * * *